(12) United States Patent
Krämer et al.

(10) Patent No.: US 7,156,557 B2
(45) Date of Patent: Jan. 2, 2007

(54) BEARING IN A MANUAL TRANSMISSION

(75) Inventors: Klaus Krämer, Baudenbach (DE); Boris Landa, Bubenreuth (DE)

(73) Assignee: INA-Schaeffler KG, Herzogenaurach (DE)

( * ) Notice: Subject to any disclaimer, the term of this patent is extended or adjusted under 35 U.S.C. 154(b) by 0 days.

(21) Appl. No.: 10/838,010

(22) Filed: May 3, 2004

(65) Prior Publication Data

US 2004/0221675 A1 Nov. 11, 2004

Related U.S. Application Data

(63) Continuation of application No. PCT/EP02/11730, filed on Oct. 19, 2002.

(30) Foreign Application Priority Data

Nov. 2, 2001 (DE) ................ 101 53 912

(51) Int. Cl.
*F16C 19/00* (2006.01)
(52) U.S. Cl. .......................... 384/55; 384/50
(58) Field of Classification Search ............ 74/437.1, 74/473.21, 473.24, 473.27, 25, 47, 48, 49, 74/50, 53; 384/50, 51, 55; 403/109.3; 464/167
See application file for complete search history.

(56) References Cited

U.S. PATENT DOCUMENTS

| | | | | |
|---|---|---|---|---|
| 2,928,702 A | | 3/1960 | Pitner et al. | |
| 3,003,827 A | * | 10/1961 | Hentschke | 384/49 |
| 3,659,909 A | * | 5/1972 | Egbert | 384/56 |
| 4,075,872 A | * | 2/1978 | Geisthoff | 464/167 |
| RE30,341 E | * | 7/1980 | Lapeyre | 198/834 |
| 4,515,415 A | * | 5/1985 | Szenger | 384/44 |
| 4,544,212 A | * | 10/1985 | Parzefall et al. | 384/49 |
| 4,705,491 A | * | 11/1987 | Andersson | 464/167 |
| 4,898,566 A | * | 2/1990 | Hakansson | 464/167 |
| 5,140,866 A | * | 8/1992 | Schetter et al. | 74/473.27 |
| 5,707,153 A | * | 1/1998 | Steinberger et al. | 384/49 |
| 6,200,225 B1 | * | 3/2001 | Hobaugh, II | 464/167 |
| 6,350,203 B1 | * | 2/2002 | Zernickel | 464/167 |
| 6,637,559 B1 | * | 10/2003 | Hoose | 188/322.16 |

FOREIGN PATENT DOCUMENTS

| | | |
|---|---|---|
| DE | 40 20 160 A1 | 1/1991 |
| DE | 41 16 823 A1 | 5/1991 |
| DE | 100 16 364 A1 | 4/2000 |

* cited by examiner

*Primary Examiner*—Richard Ridley
*Assistant Examiner*—Justin Krause
(74) *Attorney, Agent, or Firm*—Volpe & Koenig, P.C.

(57) ABSTRACT

A bearing arrangement (2) in a manual transmission for transferring torque between at least a first guide surface (14b) on a swivel element (14), which can swivel and which is fixed along the bearing relative to the manual transmission, and a second flat guide surface (19a), which can move in the longitudinal direction relative to the bearing (2) and which is supported with the swivel element (14) so that it can swivel at least in the bearing (2). The bearing holds a selector shaft (4) so that it can move in the longitudinal direction and so that it can also swivel, wherein the selector shaft (4) is provided with an adapter (19).

9 Claims, 3 Drawing Sheets

BEARING IN A MANUAL TRANSMISSION

CROSS-REFERENCE TO RELATED APPICATIONS

This application is a continuation of PCT/EP02/11730, filed Oct. 19, 2002.

BACKGROUND

The present invention relates to a bearing in a manual transmission for transferring torque between at least a first guide surface on a swivel element, which can swivel and which is fixed along the bearing relative to the manual transmission, and between a second guide surface, which can move in the longitudinal direction relative to the bearing and which is supported with the swivel element so that it can swivel at least in the bearing, wherein the guide surfaces are spaced apart from each other by means of at least one roller body, which supports in one direction the first guide surface and in a different direction the second guide surface, which is configured like a roller, and which can roll in the longitudinal direction.

A bearing of the class-forming type is described in DE 40 20 160 A1. The bearing is arranged on a central selector or control shaft and a selector rocker. The supported element, in this case a swiveling selector shaft, carries another element of the manual transmission, in this case the selector rocker, in the swivel direction over the bearing. The selector rocker is therefore supported in the housing of the manual transmission so that it can swivel and is pivoted with its free end against the force of a spring element fixed to the housing. Therefore, at the selector shaft, the spring force acting on the lever of the selector rocker produces a desired counter torque of defined magnitude as a function of a predetermined swivel angle of the selector shaft or as a function of the path in radian measure at the rocker (torque-path course). This counter torque generates, e.g., on the manual selector lever, a desired noticeable increase in the shifting force over a predetermined shifting path (force-path course).

The selector shaft is movable relative to the manual transmission along its longitudinal axis and is arranged so that it can swivel and is supported so that it can slide along its longitudinal axis but is fixed in rotation by means of the bearing in a hub of the selector rocker. The selector rocker is supported so that it can rotate but is fixed to the manual transmission longitudinal to the selector shaft. Between the hub and the selector shaft, there are roller bodies located in the hub with as little radial play as possible for low-friction longitudinal motion of the selector shaft. In the circumferential direction, the roller bodies transfer torque through the bearing to the selector rocker or in the reverse direction. The roller bodies are balls or rollers and are supported during transfer of the torque on a selector shaft formed with a round cross section in longitudinal raceways on the shaft and corresponding counter raceways on the hub.

The production of a bearing shown in DE 40 20 160 A1 is relatively complicated to manufacture based on the grooves in the hub and in the selector shaft. For these bearings, especially for bearings with balls, the value of the maximum transferable torque is often too low due to limited available installation space for roller bodies of sufficient size and number. The level is determined by the maximum permissible Hertzian stress at the contact of the roller bodies installed in the bearing in interaction with their raceways.

For the previously mentioned reasons, DE 40 20 160 A1 alternatively provides that the selector shaft has a shape deviating from a circular cross section at least in the region of the close sliding fit in the bearing. In this case, this section of the selector shaft is formed as a right prism. The side walls of the hub facing the selector shaft with the guide surfaces for the roller bodies run parallel to the side surfaces of the prism. Between the side surface on the selector shaft and the opposing guide surface on the hub, there are rollers or needles as roller bodies. The roller bodies are guided relative to each other with a cage.

The transferable torque in such a bearing is relatively high, however, the process of manufacturing profiles for the hub and the selector shaft with a shape that is different from the circular shape on the close sliding fit is comparatively complicated. The raceways for the roller bodies are usually tempered. The steel selected for the selector shaft thus must be able to be tempered based on the requirements of the raceway. In addition, the handling of the relatively large selector shafts during the tempering process increases the resulting costs for the production of such a selector shaft.

It is difficult to adapt the torque-displacement courses on the selector shaft, and thus easy shifting forces, or force-displacement courses on the manual selector level to the requirements of the shifting ease in arrangements according to the state of the art. This is also based on the fact that the bearings of the selector shaft can be loaded only partially due to their configuration mentioned in the introduction.

SUMMARY

Therefore, the problem of the invention is to create a bearing of an element, which can move along its longitudinal axis and which can swivel, in a gear change box for transferring high torque, wherein the bearing should be produced economically.

This problem is solved according to the invention in that the flat second guide surface supported with the selector shaft so that it can swivel in the bearing is formed on an adapter, with the adapter being seated tightly in the longitudinal direction and in the swivel direction of the selector shaft on the selector shaft which has a circular outer contour. With the use of an adapter, selector shafts with round cross sections can be used. The costs for the production of selector shafts formed in this way are usually lower. The selector shaft must not be provided with the previously mentioned raceways on the marked seat. The manufacturing process for the selector shaft is configured more economically. The material used for the selector shaft can be selected as a function of all other requirements on the selector shaft, such as, e.g., weldability or cost of the material, but not as a function of the quality of the raceways for the roller bodies. The adapter is preferably produced as a single part in a non-cutting manufacturing process, e.g., through sintering or preferably through cold forming of steel.

A force fit guarantees a tight seat of the adapter on the selector shaft. Alternatively, the adapter is mounted on the selector shaft undetachably through welding or detachably by a pin connection or the adapter is a sleeve-shaped component made from sheet metal with at least two flat second guide surfaces. The adapter is fixed to the selector shaft at least in the longitudinal direction by at least one element, which is formed toward the inside in the radial direction from the sheet metal and which engages in a recess in the selector shaft. The shaped element is, e.g., a stamping or a bracket partially stamped and bent from the sheet metal.

The adapter is produced independent of the selector shaft and is to be produced economically especially in mass production as a drawn part also formed from sheet metal. In the production process, the handling of an adapter that is small compared with the selector shaft is usually simpler than the handling of a complete selector shaft. The costs for the cost-intensive hardening of the selector shaft at the bearing seat are replaced by the significantly more economical heat treatment of the adapter formed with a low volume compared with the selector shaft. The adapter is preferably produced from deep-drawn steel through cold forming, just like the other parts of a selector device, such as a swiveling lever, a locking segment, and the carrier plate.

In one configuration of the invention, the outer contour of the adapter is a right prism, with the second guide surface being formed at least on one of the side surfaces of the prism. Right prisms form, e.g., elongated triangular, rectangular, or hexagonal profiles. Preferably an adapter is used, whose outer contours describe a square column, thus, e.g., a square rectangular profile. The guide surfaces for the guidance of the roller bodies are formed on at least one section, preferably on each of the side surfaces of the adapter facing outwards. Both the first, mostly flat guide surfaces facing inwards and opposite the second guide surfaces on the swivel element and also the second, mostly flat guide surfaces on the adapter are preferably produced by the forming with a surface, whose quality corresponds to the requirements of raceways for linear bearings in this application. The surface is preferably formed with sufficient surface roughness through drawing and hardened if necessary. Metal cutting finishing is usually not required.

Between the first and second guide surfaces there are roller bodies, preferably rollers or needles guided in one cage per side surface of the adapter or in a cage surrounding the adapter in the circumferential direction and housing all of the roller bodies. The roller bodies are arranged in the roll-off direction in one line one behind the other or in several lines, preferably two lines, one next to the other. High torque in the bearing can be transferred, because several roller bodies can be used and the linear contact of the roller bodies with the raceway has a favorable effect on the contact pressure. The selector shaft can consequently move easily in the longitudinal direction due to the low resistance through roller friction of the roller bodies rolling in the push direction of the selector shaft.

The bearing is configured with no gaps in the radial direction if the adapter is formed to be flexible with sufficiently thin sheet metal in the raceway region for the roller bodies. The roller bodies are then mounted in all tolerance positions of the bearing with simple pre-tensioning between the swivel element and the adapter. Radial overlaps in the bearing are compensated for by the radial elastic, inherent spring deflecting guide raceways or by flexible regions, which are arranged directly next to the guide raceways on the adapter and are supported on the selector shaft. However, radial contact for the raceways against the selector shaft limits the radial spring deflection, when high torque is to be transferred.

On the inside, the configuration of the adapter is adapted to the periphery of the selector shaft, which are generally circular in cross section. Here, the adapter preferably is seated with a force fit on the selector shaft. The selector shaft can obviously also have any other shape of cross sections or profile that is different from a circular shape. For the transfer of high torque, the adapter is fixed in its position on the sliding seat by a pin connection or by a weld on the selector shaft. Preferably, however, the adapter is formed as a rectangular hollow profile and sits on and surrounds the selector shaft. On a selector shaft with circular cross section, the inner surfaces of the adapter contact the outer surface of the selector shaft only in certain sections. The seat of the adapter on the selector shaft is preferably provided with a groove formed in the longitudinal direction in the profile of the adapter in all inner surfaces. The groove is cut out like a circular arc, viewed in cross section, so that the selector shaft fits into the groove with a part of outer surface bulging outwards forming an arc shape. Therefore, on one hand an exactly centered seat of the adapter relative to the longitudinal center axis of the selector shaft, especially for a force fit, is achieved. On the other hand, such matching inner walls of the adapter ensure the transfer of higher torque. As an alternative or addition, the selector shaft is provided on the seat of the adapter with a recess or a hole, in which sheet metal material from the wall of the adapter is pressed and deformed inwards in the radial direction. The sheet-metal material engaged in the hole secures the adapter on the shaft not only in the longitudinal direction, but also in the swivel direction.

In another configuration of the invention, the swivel element is a swivel lever and this swivel lever is arranged on the bearing itself, fixed and able to swivel about the longitudinal direction relative to the selector shaft and to the manual transmission. For this purpose, the swivel lever is provided on one end with a hub or at least one hub-like projection. The hub or the projection has a hole, which is adapted in its free cross section to the outer profile of the adapter so that each of the second guide surfaces aligned parallel on the side surfaces of the adapter is opposite a first flat guide surface in the hole of the hub. Between these surfaces, the roller-like roller bodies as already described above are arranged alternatively in one or more cages. On the outside, on the hub or on the projection at least one collar or the like is provided in the bearing or on the manual transmission as a receptacle. On the inner surface of the collar there is preferably a hole formed with the four flat inner surfaces or first guide surfaces. Preferably, the collar is made from a lever stamped from sheet metal in the shape of a drawn sleeve extending in the longitudinal direction of the selector shaft. The sleeve is supported so that it can swivel outwards relative to the manual transmission and is fixed relative to the manual transmission in the direction of motion of the selector shaft. One configuration of the invention provides a collar, whose outer contour, e.g., is circular. Another configuration provides a collar on the swivel element, which has the cross section of a rectangular profile. The collar is rounded on its four outer edges so that a seat of the collar, which is centered relative to the swivel axis of the bearing and which can also swivel, is secured in a bearing ring arranged separately in the bearing. The bearing ring itself, of round cross section inside and out, is supported so that it can swivel relative to the transmission in the housing of the transmission or in a carrier plate.

The swivel lever acts on a spring element fixed to the housing of the manual transmission, e.g., on a selector rocker for generating shifting forces or for creating a contact lock against unintentional gear shifting. Another configuration provides that the swivel lever is a shift finger.

It is further provided that the swivel lever is a component of a device for generating shifting forces on the selector shaft. The swivel lever acts for generating the shifting forces through the selector shaft which can swivel on an elastic spring element. There is a rocking lever at least for generating the shifting forces between the swivel lever and the spring element. The pivoted swivel lever is set at a distance to a rocking axis of the rocking lever and mostly engages with the end of its lever arm to the rocking lever. Simultaneously, the spring element is pretensioned against the rocking lever pivoting about the rocking axis against the rocking lever. The swivel lever engages at a distance to the rocking axis of the rocking lever to the rocking lever, at, e.g., a two-arm rocking lever. The spring element also contacts one of the lever arms of the rocking lever at a distance from the rocking axis of the rocking lever.

For generating the shifting forces, the swivel lever must act with a force on the rocking lever. For this purpose, the rocking lever projects into the swiveling region of the swivel lever. The selector shaft is pivoted and swivels with the swivel lever. Here, the swivel lever meets/acts on the rocking lever and tips this from a starting position about its rocking axis. The lever then preferably rocks in the opposite sense of rotation relative to the sense of rotation of the swivel lever. Because the spring element contacts a different end of the rocking lever, the rocking lever moves against the resistance of the spring force of the spring element. The spring(s) in the spring element flex elastically. When the selector shaft is pivoted back, or when the counter force is not present on the selector shaft, the swivel lever pivots away from the rocking lever into a starting position mostly against a stop on the transmission housing or a carrier plate. The energy of the spring(s) then also forces the rocking lever pivoting about its rocking axis and thus the rocking lever under some circumstances forces the swivel lever by means of the spring force and thus the selector shaft pivots back into a starting position.

In the lever mechanism, the rocking lever connected between the spring element and the swivel lever steps up or down the spring force of the spring element and generates a counter force on the swivel lever and a torque about the swivel axis on the pivoted selector shaft. The shifting force on the selector lever increases and signals with its increase deviating from the normal value to the operator, e.g., that it is about to set the reverse gear. The spacing of the position/s to the rocking axis, with which the spring element and the swivel lever contact the rocking lever, as well as the spring force of the spring element determine the force on the swivel lever. This force and the length of the swivel lever, beginning from its contact on the rocking lever up to the swivel axis of the selector shaft, finally determine the torque on the selector shaft. The torque on the selector shaft is in turn converted directly or over additional lever arrangements into a shifting force that is noticeable on the manual shifting lever for the operator. The shifting force then lies over the shifting forces, which occur for the selection of other gears. With the shape of the rocking lever and the selection of the lever ratios on the rocking lever, the shifting forces or torque to be generated can be tuned very fine as a counter reaction to the spring force. Also for small swivel angles of the selector shaft, a good resolution of the torque-displacement or force-displacement course is achieved. The torque-displacement or force-displacement course is also dependent on the construction of the spring element. According to the type, number and arrangement and configuration of springs in the spring element, the characteristic spring line and thus also the counter force on the rocking lever can be adapted to different requirements.

Configurations of the invention provide the use of one or more helical springs, which can be connected in series or parallel and which pretension a pin against the rocking lever. The pin is centered in a helical spring and receives a ball on its end facing the rocking lever. The ball rolls for a moving rocking lever approximately rotating around its center on the surface of the rocking lever, e.g., on a ramp. The pin is then formed like the pins from locks typically used in manual transmissions. The ball is usually supported in a dome-shaped recess on the pin, mostly under the help of several relatively small balls. The pin is supported against the helical spring so it can move with the helical spring in a housing of the lock. The housing of the lock is arranged rigidly on the manual transmission, e.g., on a carrier plate.

The carrier plate is a plate, which holds selector shafts, swivel lever, rocking lever, and spring elements pre-assembled into a structural unit. The carrier plate is to be mounted on a transmission in connection with its pre-assembly.

The invention is further equipped with a swivel lever supported on a carrier plate so that it can swivel. The carrier plate, just like the rocking lever and the swivel lever, is preferably made from sheet metal in a non-cutting manufacturing process as much as possible. Methods, such as stamping, fine stamping, imprinting, drilling, bending, and drawing, are preferably used for production. In addition to the swivel lever, the carrier plate preferably also holds the spring element and the rocking lever and also supports the selector shaft.

The selector shaft is guided and supported so that it can swivel and move in the longitudinal direction in the carrier plate. The swivel axis preferably penetrates the selector shaft, just like the rocking axis of the rocker lever penetrates the carrier plate, wherein the axes are preferably aligned perpendicular to the carrier plate. The center axis/axes of one or more helical screw(s) in the spring element preferably run parallel and aligned to the surface of the carrier plate or act perpendicular to the rocking axis of the rocking lever. The carrier plate can be provided pre-assembled as a structural unit in the manual transmission. The adapter is preferably formed in turn as a rectangular hollow profile with at least a second guide surface on its outwards facing side surfaces and sits on the selector shaft, surrounding the selector shaft.

Finally, in one configuration of the invention, the swivel element is a locking segment of a shifting device that is supported so that it can swivel in the longitudinal direction in the bearing, wherein the locking segment that can swivel is in timed active connection with at least one other selector shaft arranged in the shifting device adjacent to the selector shaft, such that the other selector shaft is blocked against its shifting movements. The locking segment likewise has a collar like the swivel lever described in the different variants. The locking segment is thus also arranged, fixed, or supported according to the previously described variants to the adapter and to the manual transmission.

It is also conceivable to form a locking contour on the swivel element. Then a ball of a locking element arranged rigidly with the manual transmission, e.g., rigidly on the carrier plate, travels over the locking contour. The ball locks in the locking contour in certain shifting swivel positions in lock recesses. The selector shaft is therefore locked in certain swivel positions relative to the manual transmission in this position.

An arrangement of a swivel lever and one of the previously mentioned locking segments together with a selector shaft and a carrier plate is also significant. Here, the collars of the swivel lever and the locking element are arranged concentric to each other and engage the selector shaft with the adapter and the roller bodies guided in at least one cage. The adapter is in turn formed preferably as a rectangular hollow profile and sits as already described on the selector shaft. Either the swivel lever surrounds the collar of the locking element or vice versa.

If the swivel lever has a collar surrounding the other collar of the locking element, the collar of the locking segment has the cross section of a rectangular profile. The collar is rounded on its four outer edges so that a seat of the collar that is centered relative to the swivel axis of the bearing and that can swivel is fixed in the collar of the swivel lever. The inner surfaces belonging to the rectangular profile sitting on a selector shaft have the first guide surfaces, which are opposite the second guide surfaces on the adapter. The collar of the swivel lever itself, of round cross section inside and out, sits so that it can swivel relative to the transmission.

If the locking segment with a collar surrounds the other collar of the swivel lever, the collar of the swivel lever has the cross section of a rectangular profile. The collar is rounded on its four outer edges so that a seat of the collar centered relative to the swivel axis of the bearing is secured in the collar of the locking lever. The inner surfaces of the rectangular profile sitting on a selector shaft have the first guide surfaces, which are opposite the second guide surfaces on the adapter. The collar of the locking lever itself, of round cross section inside and out, is supported so that it can swivel relative to the transmission.

BRIEF DESCRIPTION OF THE DRAWINGS

The invention is described in more detail in the following with reference to the preferred embodiments. In the drawings.

DETAILED DESCRIPTION OF THE PREFERRED EMBODIMENTS

Figure 1:
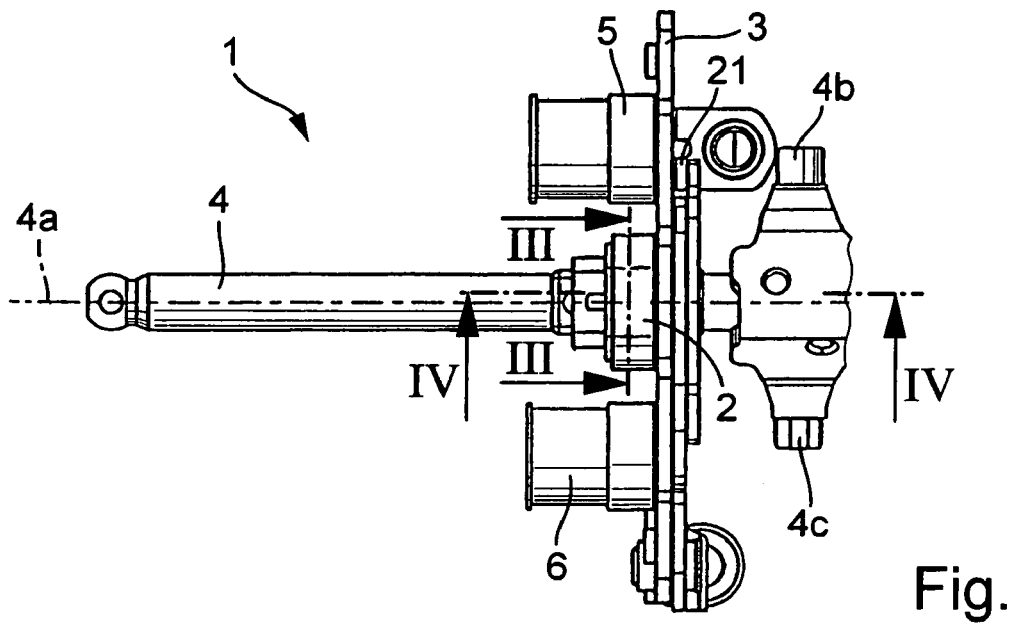
FIG. 1 is a plan view of a shifting device with an embodiment of a bearing according to the invention.

FIG. 1 shows an embodiment of a shifting device 1 with a bearing 2 for transferring torque. In a carrier plate 3, a selector shaft 4 can move along the swivel axis 4a and is supported in the bearing 2 so that it can swivel about the swivel axis 4a. The carrier plate has other bearing points 5 and 6 for holding other not shown selector shafts. Shift fingers 4b and 4c are mounted on the selector shaft 4.

Figure 2:
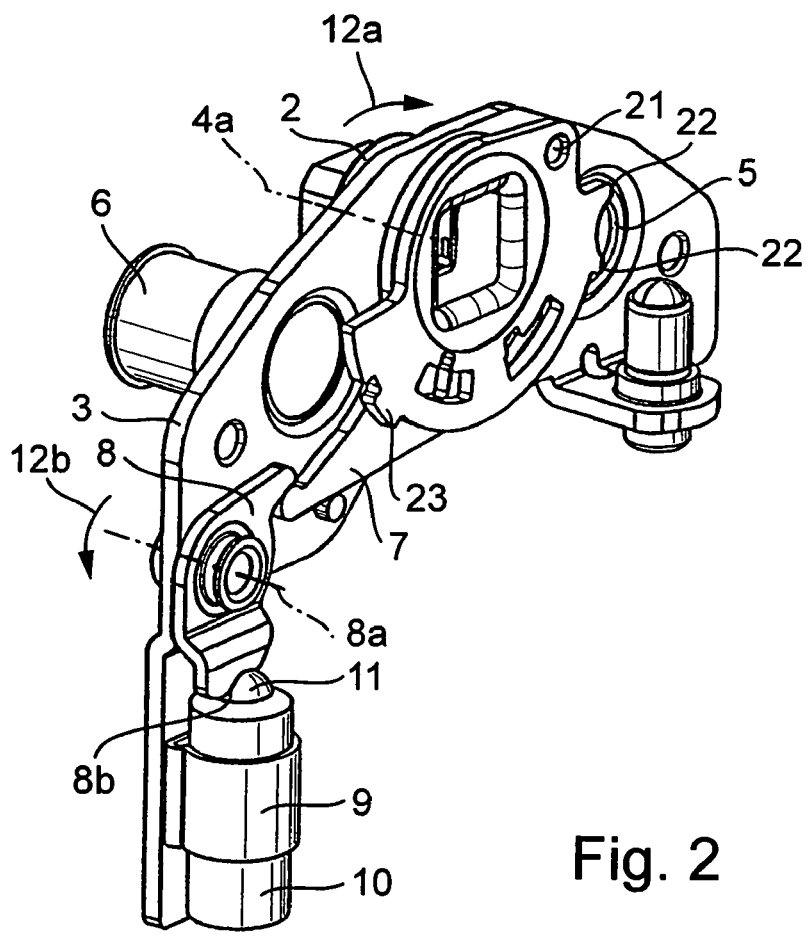
FIG. 2 is an overall view of the shifting device from FIG. 1 without the selector shaft.

In FIG. 2, the shifting device 1 is shown without the selector shaft. The shifting device 1 has a swivel lever 7. The swivel lever 7, which is pivotable on the selector shaft 4, acts for the creation of an increased shifting force on a rocking lever 8. The rocking lever 8 is arranged between the swivel lever 7 and a spring element 9 so that it can rock about a rocking axis 8a. The lever end of the swivel lever 7 contacts one lever end of the rocking lever 8. The spring element 9 is pretensioned against the other end of the rocking lever 8. The spring element 9 is formed from a helical spring held in a housing 10 and a pin with a locking ball 11. The pin and the spring are surrounded by the housing 10 and thus not visible, wherein the spring pre-tensions the pin with the ball 11 against a ramp 8b of the rocking lever.

A selector shaft 4 pivoted with the swivel lever 7 in the swivel direction 12a from FIG. 1 acts on the rocking lever 8 with the pivoting swivel lever 7. The rocking lever 8 here rocks in the rocking direction 12b and thus against the spring element 9. The ramp 8b travels against the ball 11, wherein the ball 11 in the housing 10 flexes the spring element 9.

Figure 3:
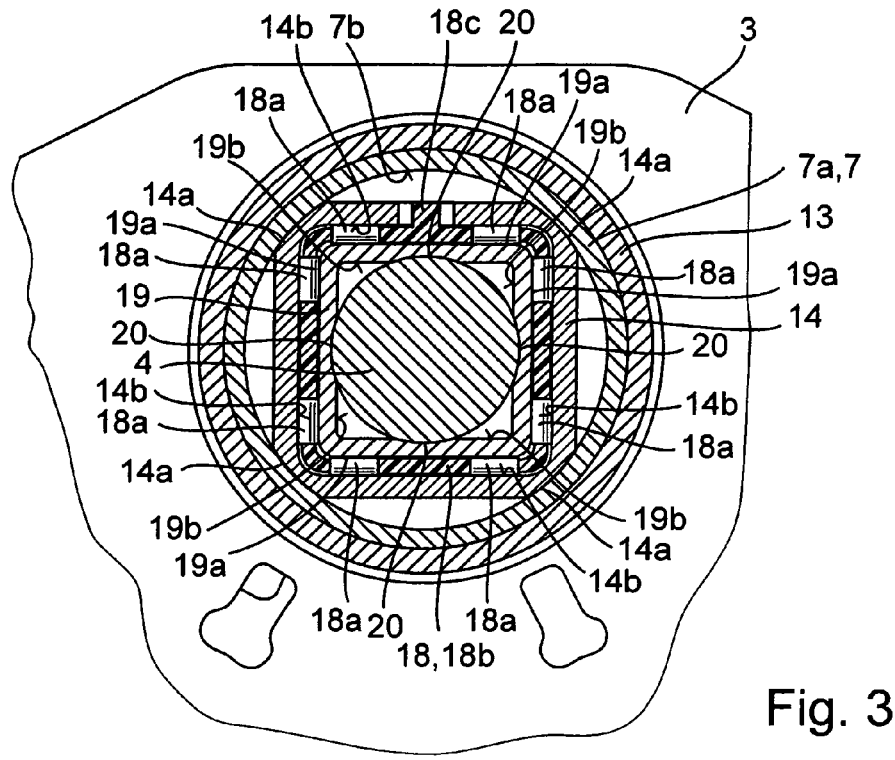
FIG. 3 is a cross-sectional view of the bearing for transferring torque from the device according to FIG. 1 taken along the line III—III.
Figure 4:
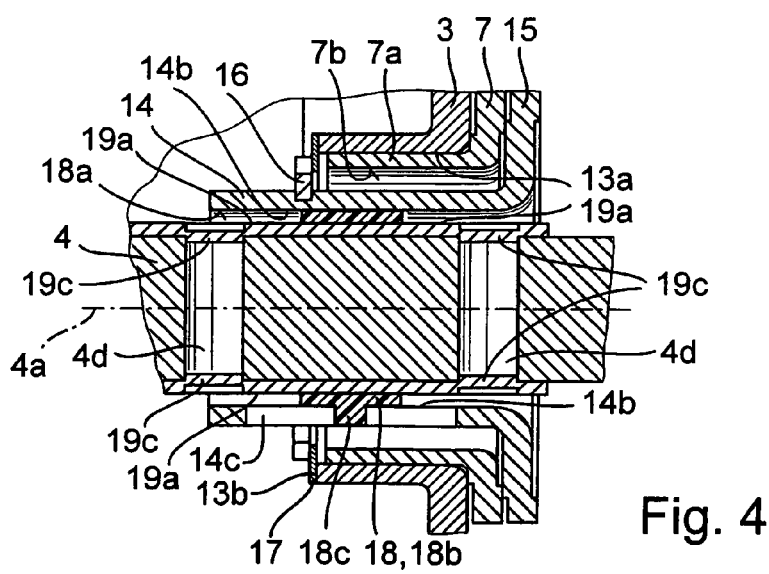
FIG. 4 is a cross-sectional view through the bearing for transferring torque from the device according to FIG. 1 taken along the line IV—IV.

The bearing 2 for the selector shaft 4 is enlarged in FIGS. 3–4 and shown in section. In a collar 13 of the carrier plate 3 with a cylindrical hole 13a, the swivel lever 7 is supported so that it can swivel. The swivel lever 7 has a collar 7a for this purpose. The collar 7a is cylindrical like a sleeve and surrounded by the collar 13. The collar 7a sits in the hole 13a with its outer surface matching the hole shape. Along the swivel axis 4a, the swivel lever 7 is fixed in the direction to the carrier plate 3 and retained in the other direction by means of a latch locking washer 15.

The latch locking washer 15 has a swivel element 14. The swivel element 14 extends in the longitudinal direction of the swivel axis 4a from the latch locking washer 15 and is a hollow rectangular profile viewed in its cross section according to FIG. 3. The four corners 14a of the rectangular profile are rounded and the circular arc shape is adapted to the inner surface of the hole 7b. The swivel element 14 sits with the four corners 14a centered in the collar 7a. In the longitudinal direction of the swivel axis 4a, the latch locking washer 15 is secured over the swivel element 14 by a locking washer 16 to the collar 13 of the carrier plate 3. The locking washer 16 is supported over another washer 17 on the end 13b of the collar 13.

The inwardly directed surfaces of the rectangular profile of the swivel element 14 are guide surfaces 14b for a linear bearing 18. The linear bearing 18 has roller bodies 18a in the form of needles, which can roll in the longitudinal direction along the swivel axis 4. At each of the guide surfaces 14b, two series of roller bodies 18a arranged one behind the other in a cage 18b. Towards the inside, the roller bodies 18a each contact guide surfaces 19a. The guide surfaces 19a are formed on an adapter 19. The outer contours of the adapter 19 describe a square column. Each of the four side surfaces of the prism has one of the guide surfaces 19a.

The adapter 19 is a hollow rectangular profile viewed in its cross section. The adapter 19 sits on the selector shaft 4. The flat inner surfaces 19b facing inwards contact a section with a groove 20 on the selector shaft 4. The groove 20 has a circular shaped cross section adapted to the connecting arc-shaped section of the selector shaft 4. The selector shaft 4 is centered in the grooves 20 nestled into the adapter 19. Outside of the guide surfaces 19a viewed in the longitudinal direction of the swivel axis 4a, the adapter 19 is provided with indentations 19c. These indentations 19 press the material of the adapter 19 inwards into a hole 4d of the selector shaft 4. Alternatively, the hole 4d is also provided as an annular groove in the selector shaft 4. With these indentations 19c, the adapter 19 is fixed on the selector shaft 4. The path of the linear bearing 18 in the longitudinal direction of the selector shaft 4 is limited by a tab 18c engaging in a longitudinal groove 14c to the cage 18b. The cage 18b with the roller bodies 18a can thus move only over the axial path given by the length of the longitudinal groove 14c.

The adapter 19 pivoted with the selector shaft 4 is supported over its guide surfaces 19a on the roller bodies 18a. The roller bodies 18a are in turn supported on the guide surfaces 14b of the swivel element 14 and carry the swivel element 14 in the swivel direction 12a of the selector shaft 4. The latch locking washer 15 formed integrally with the swivel element 14 consequently also swivels with the selector shaft 4. The swivel element 14 is supported by its corners 14a so that it can swivel relative to the swivel lever 7 in the collar 13 at the swivel lever 7. Only when a latch 21 formed on the latch locking washer 15 (FIGS. 1 and 2) engages behind the swivel lever 7 at one of the body edges opposite the swivel direction 12a does the latch locking washer 15 carry the latch 21 with the swivel lever 7 in the swivel direction 12a. The selector shaft 4, the adapter 19, the swivel element 14, and the swivel lever 7 pivot relative to the fixed movement carrier plate 3 in the collar 13 of the carrier plate.

The latch locking washer 15 is provided with locking stops 22 and 23. These locking stops 22 and 23 act on selector shafts, which are arranged adjacent to the selector shaft 4 in the bearing positions 5 and 6 and which are not shown, in certain shifting positions, and thus prevent unintentional and counteracting shifting movements in a manual transmission.

Figure 5:
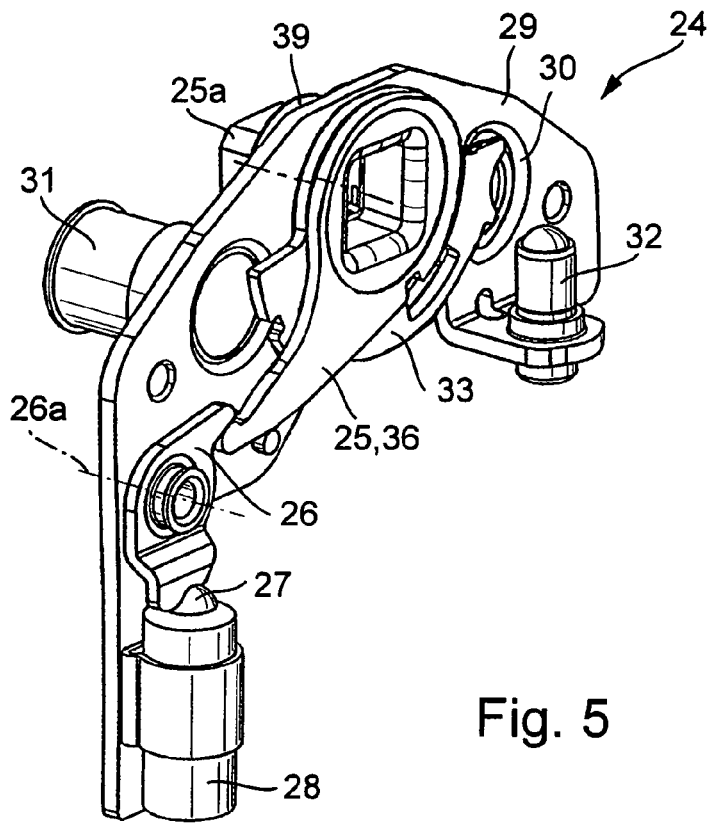
FIG. 5 is an overall view of another embodiment of a device with a bearing for transferring torque in accordance with the invention.
Figure 6:
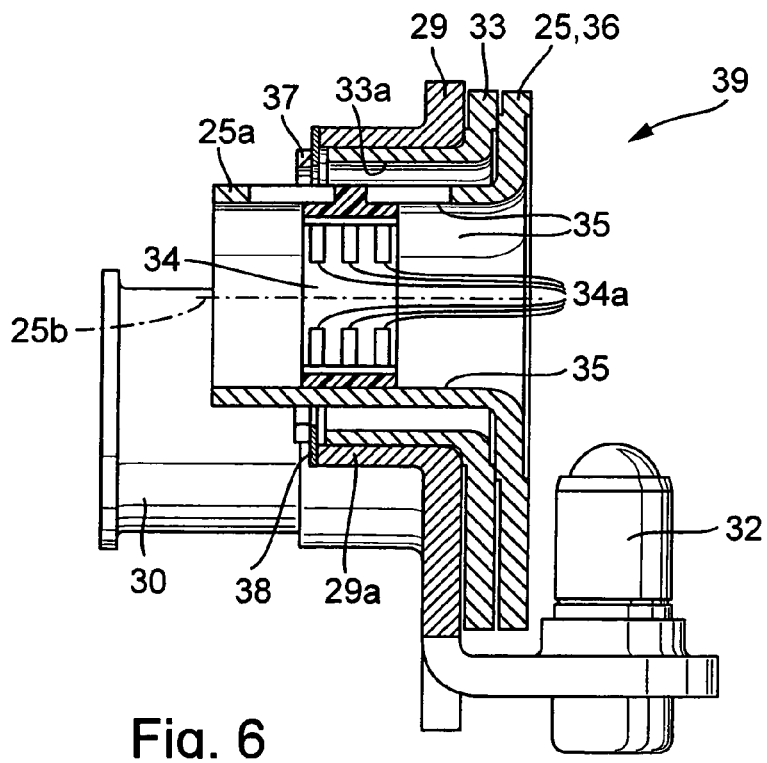
FIG. 6 is a longitudinal section view through the bearing of the device according to FIG. 5.

FIGS. 5 and 6 show another embodiment of the invention, a bearing 39 in a shifting device 24. The shifting device 24 is shown without selector shaft and has a swivel lever 25. The swivel lever 25 acts for generating shifting forces on a rocking lever 26 and rocks it about the rocking axis 26a against a ball 27 of a spring element 28. The swivel lever 25, the rocking lever 26, and also the spring element 28 are arranged on a carrier plate 29. In addition, the carrier plate 29 also has bearing positions 30 and 31 for other not shown selector shafts as well as a lock 32 for locking one of these selector shafts. Between the carrier plate 29 and the swivel lever 25, there is a carrier locking washer 33.

The swivel lever sits in the bearing 39 in the carrier plate 29. On the swivel lever 25 there is a collar 25a, whose cross section has the cross section of a rectangular profile. In this collar, a not shown selector shaft is supported by means of the roller bodies 34a of a roller cage 34. The inner surfaces of the rectangular profile of the collar 25a are the first guide surfaces 35 of the swivel element 36 formed from the swivel lever 25 and the collar 25a. The swivel element 36 is supported so that it can swivel in a collar 33a. The collar 33a is formed integrally with the latch locking washer 33 and has a cylindrical cross-sectional profile. With its outer surface, the collar 33a sits in a collar 29a of the carrier plate. In the collar 29a, the collar 33a can swivel but is fixed in the axial direction, i.e., it is held rigidly and supported along the swivel axis 25b. Here, the collar 33a sits between the swivel lever 25 and the carrier plate 29, with the swivel lever 25 being fixed over the collar 25a with a safety ring 37 along the swivel axis 25b against the collar 29a of the carrier plate 29. The safety ring 37 is supported over a washer 38 on the collar 29a. A selector shaft provided with an adapter typically sits in the collar 25a. The selector shaft can move along the swivel axis 25b arranged on the swivel lever 25, but carries the swivel lever 25 in the swivel direction.

REFERENCE SYMBOLS

1 Shifting device
2 Bearing
3 Carrier plate
4 Selector shaft
4a Swivel axis
4b Shift finger
4c Shift finger
4d Hole
5 Bearing position
6 Bearing position
7 Swivel lever
7a Collar
7b Hole
8 Rocking lever
8a Rocking axis
8b Ramp
9 Spring element
10 Housing
11 Ball
12a Swivel direction
12b Rocking direction
13 Collar
13a Hole
13b End
14 Swivel element
14a Corner
14b Guide surface
14c Longitudinal groove
15 Latch locking washer
16 Safety washer
17 Washer
18 Linear bearing
18a Roller body
18b Cage
18c Tab
19 Adapter
19a Guide surface
19b Inner surface
19c Indentation
20 Groove
21 Latch
22 Locking stop
23 Locking stop
24 Shifting device
25 Swivel lever
25a Collar
25b Swivel axis
26 Rocking lever
26a Rocking axis
27 Ball
28 Spring element
29 Carrier plate
29a Collar
30 Bearing position
31 Bearing position
32 Lock
33 Latch locking washer
33a Collar
34 Roller cage
34a Roller body
35 Guide surface
36 Swivel element
37 Safety ring
38 Washer
39 Bearing

The invention claimed is:

1. A bearing arrangement (2, 39) for a manual transmission for transferring torque between at least a first guide surface (14b, 35) on a swivel element (14, 36), which can swivel and which is fixed alone the bearing (2, 39) relative to the manual transmission, and a second guide surface (19a), which can move in a longitudinal direction relative to the bearing (2, 39) and which is supported with the swivel element (14, 36) so that it can swivel at least in the bearing (2, 39), comprising the guide surfaces (14b, 35, 19a) being spaced apart from each other by at least one roller body (18a, 34), which supports in one direction the first guide surface (14b, 35) and in the other direction the second guide surface (19a), the roller body comprising rollers that can roll in the longitudinal direction, the second guide surface (19a) is formed on an adapter (19), wherein the adapter (19) is seated in the longitudinal direction and in the swivel direction on a selector shaft (4) with a circular outer contour, the outer contour of the adapter (19) generally forms a right prism having side surfaces, and at least the second guide surface (19a) is formed on one of the side surfaces of the prism, the adapter (19) has a hollow rectangular profile in cross section, having at least one inner surface (19b) that contacts the selector shaft (4) at least in certain sections, and the selector shaft (4) is nestled against one of the inner surfaces (19b) of the adapter (19) at least in sections in at least a groove (20) extending in the longitudinal direction, wherein the groove (20) is provided with a circular arc-shaped cross section that is adapted to a contacting arc-shaped section of the selector shaft (4).

2. The bearing arrangement according to claim 1, wherein there are four side surfaces of the prism and each of the four side surfaces has a second guide surface (19a) and a plurality of the roller bodies (18a, 34a) are arranged one behind the other in the longitudinal direction in one cage (18b, 34) for each of the side surfaces between the first guide surface (14b, 35) and the second guide surface (19a).

3. The bearing arrangement according to claim 1, wherein there are four side surfaces of the prism and each of the four side surfaces has a second guide surface (19a) and a plurality of roller bodies are arranged between the flat first guide surface (14a, 35) and the second guide surfaces (19a) in the longitudinal direction one behind the other, wherein all of the roller bodies (18a, 34a) are guided in a cage (18b, 34) surrounding the selector shaft (4).

4. The bearing arrangement according to claim 1, wherein the adapter (19) has an outer contour which forms a square column, wherein a second guide surface (19a) is formed on each of the four side surfaces of the prism.

5. The bearing arrangement according to claim 1, wherein the swivel element (36) is at least a swivel lever (25), wherein the swivel lever (25) is supported so that it can swivel and is fixed in the longitudinal direction in the bearing (39).

6. The bearing arrangement according to claim 5, wherein the swivel lever (25) surrounds the adapter (19) with the selector shaft (4) and is arranged concentric to a longitudinal center axis of the selector shaft (4).

7. The bearing arrangement according to claim 5, wherein the swivel lever (25) is a component of a shifting device (24) for generating shifting forces on the selector shaft (4), and the swivel lever (25) for generating the shifting forces by the selector shaft (4) acts so that it can swivel on an elastic spring element (28), and at least for generating shifting forces between the swivel lever (25) and the spring element (28) there is a rocking lever (26), wherein the pivoted swivel lever (25) contacts the rocking lever (26) which swivels about a rocking axis (26a) at a distance to the rocking lever (26) and simultaneously the spring element (28) is pre-tensioned against the rocking lever (26).

8. The bearing arrangement according to claim 1, wherein the adapter (19) is a sleeve-shaped component made from sheet metal with at least two flat second guide surfaces (19a) and the adapter (19) is fixed an the selector shaft (4) at least in the longitudinal direction by at least one shaped element (19c) formed from the sheet metal on an inside thereof extending in a radial direction and engaging in a recess (4d) on the selector shaft (4).

9. A manual transmission comprising a bearing (2, 39) for transferring torque between first guide surfaces (14b, 35) on a swivel element (14, 36), which can swivel and which is fixed along the bearing (2, 39) relative to the manual transmission, and second guide surfaces (19a), which can move in a longitudinal direction relative to the bearing (2, 39) and which is supported with the swivel element (14, 36) so that it can swivel at least in the bearing (2, 39), comprising the guide surfaces (14b, 35, 19a) being spaced apart from each other by roller bodies (18a, 34), which supports in one direction the first guide surfaces (14b, 35) and in the other direction the second guide surfaces (19a), the roller bodies comprising rollers that can roll in the longitudinal direction, the second guide surfaces (19a) are formed on an adapter (19), wherein the adapter (19) is seated in the longitudinal direction and in the swivel direction on a selector shaft (4) with a circular outer contour the swivel element is a swivel lever and the swivel lever (7, 25) and a rocking lever (8, 26) are held so that they can swivel on a carrier plate (3, 29) fixed relative to the manual transmission, the adapter (19) is a hollow rectangular profile in cross section, having flat inner surfaces facing inwards that contact the selector shaft (4) at least in certain sections and each of the four side surfaces of the prism form the second guide surfaces (19a) opposite the first guide surfaces (14b, 35), wherein a plurality of the roller bodies are provided between each of the first guide surfaces (14b, 35) and the second guide surfaces (19a) and are arranged one behind the other in a cage (18b, 34), the swivel lever (7, 25) and a spring element (9, 28) contact the rocking lever (8, 26) at least while generating the shifting force, and the spring element (9, 28) is a lock having a ball (11, 27) supported in a dome-shaped receptacle of a pin, and the pin is held in a housing (10) fixed relative to the carrier plate (3, 29) so that the pin can move along the rotational axis of a helical spring and is also pre-tensioned by the helical spring in a direction of the rocking lever (8, 26).

\* \* \* \* \*